(12) United States Patent
Nakashima et al.

(10) Patent No.: US 11,486,543 B2
(45) Date of Patent: Nov. 1, 2022

(54) MODULE WITH REDUCED DETERIORATION OF BINDING MEMBER

(71) Applicant: TOYOTA JIDOSHA KABUSHIKI KAISHA, Toyota (JP)

(72) Inventors: Kenichiro Nakashima, Toyota (JP); Yasumasa Oguma, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 17/023,737

(22) Filed: Sep. 17, 2020

(65) Prior Publication Data

US 2021/0116070 A1 Apr. 22, 2021

(30) Foreign Application Priority Data

Oct. 16, 2019 (JP) .............................. JP2019-189329

(51) Int. Cl.
*F17C 1/06* (2006.01)
*F17C 1/14* (2006.01)
(Continued)

(52) U.S. Cl.
CPC .................. *F17C 1/06* (2013.01); *F17C 1/14* (2013.01); *H01M 50/116* (2021.01)

(58) Field of Classification Search
CPC ...... F17C 1/06; F17C 1/04; F17C 1/02; F17C 1/14; H01M 50/116; H01M 50/10
(Continued)

(56) References Cited

U.S. PATENT DOCUMENTS

| | | | | |
|---|---|---|---|---|
| 1,696,725 A | * | 12/1928 | Murray | F22B 37/00 220/639 |
| 2,376,351 A | * | 5/1945 | Gay | B23K 5/006 220/586 |

(Continued)

FOREIGN PATENT DOCUMENTS

| | | |
|---|---|---|
| CN | 104203541 A | 12/2014 |
| CN | 108278480 A | 7/2018 |

(Continued)

OTHER PUBLICATIONS

U.S. Appl. No. 16/984,055, filed Aug. 3, 2020.
Office Action issued to U.S. Appl. No. 16/984,055 dated Jul. 13, 2022.

*Primary Examiner* — Robert J Hicks
(74) *Attorney, Agent, or Firm* — Dickinson Wright, PLLC (57) ABSTRACT

A module includes a first member that is a battery or a gas tank in which pressure fluctuation happens along one axis direction, a pair of second members, the second members being arranged on end portions of the first member in the one axis direction, respectively, and a binding member binding the first member and the second members while pressurizing them. The binding member is formed as fiber-reinforced plastic (FRP) containing fiber and resin is revolved. The FRP includes a base fiber layer with a fiber direction along a revolution direction, and a reinforcing fiber layer with a fiber direction different from that of the base fiber layer. The reinforcing fiber layer has a non-overlapping portion between both end portions in a revolved state. The non-overlapping portion is positioned in a region facing the first member.

5 Claims, 5 Drawing Sheets

(51) Int. Cl.
  *H01M 50/11* (2021.01)
  *H01M 50/116* (2021.01)
(58) Field of Classification Search
  USPC ...... 220/590, 589, 588, 586, 62.19; 206/0.6;
  242/472.8, 470, 430; 156/169
  See application file for complete search history.

(56) References Cited

U.S. PATENT DOCUMENTS

| | | | | |
|---|---|---|---|---|
| 3,112,234 | A * | 11/1963 | Krupp | B29C 53/60 |
| | | | | 156/169 |
| 3,733,219 | A * | 5/1973 | Courtot | H01M 50/10 |
| | | | | 429/127 |
| 4,749,422 | A * | 6/1988 | Kondo | B29C 70/86 |
| | | | | 156/166 |
| 5,025,943 | A * | 6/1991 | Forsman | F17C 1/16 |
| | | | | 220/589 |
| 5,284,996 | A * | 2/1994 | Vickers | B64G 1/22 |
| | | | | 405/129.55 |
| 6,953,129 | B2 * | 10/2005 | DeLay | F17C 1/06 |
| | | | | 220/562 |
| 2005/0064268 | A1 | 3/2005 | Cho et al. | |
| 2012/0037745 | A1 * | 2/2012 | Aiyama | B29C 53/605 |
| | | | | 242/430 |
| 2012/0094041 | A1 | 4/2012 | Parfrey | |
| 2013/0193255 | A1 * | 8/2013 | Tanigawa | B29C 70/32 |
| | | | | 242/472.8 |
| 2014/0154437 | A1 | 6/2014 | Schroeder et al. | |
| 2015/0292677 | A1 * | 10/2015 | Curless | B29C 70/86 |
| | | | | 156/86 |
| 2016/0126583 | A1 * | 5/2016 | Kato | H01M 10/049 |
| | | | | 429/185 |
| 2018/0195669 | A1 | 7/2018 | Sawai | |
| 2018/0356037 | A1 | 12/2018 | Yokoi et al. | |
| 2019/0049068 | A1 | 2/2019 | Sawai et al. | |
| 2019/0198830 | A1 * | 6/2019 | Kawakami | H01M 50/209 |
| 2019/0221795 | A1 | 7/2019 | Fujishima et al. | |
| 2019/0301676 | A1 | 10/2019 | Sawai | |
| 2020/0049312 | A1 * | 2/2020 | Sawai | F17C 1/06 |
| 2020/0072415 | A1 * | 3/2020 | Kamiya | B65H 54/16 |
| 2021/0095818 | A1 | 4/2021 | Sawai | |
| 2021/0146647 | A1 * | 5/2021 | Takemoto | B32B 5/02 |

FOREIGN PATENT DOCUMENTS

| | | | |
|---|---|---|---|
| CN | 109962192 A | | 7/2019 |
| CN | 110034253 A | | 7/2019 |
| JP | H08216277 A | | 8/1996 |
| JP | 2001504632 A | | 4/2001 |
| JP | 2005142145 A | | 6/2005 |
| JP | 2008032088 A | | 2/2008 |
| JP | 2010244894 A | | 10/2010 |
| JP | 2011508383 A | | 3/2011 |
| JP | 2017155768 A | | 9/2017 |
| JP | 2018119578 A | | 8/2018 |
| JP | 2019507856 A | | 3/2019 |
| JP | 2019106275 A | | 6/2019 |
| WO | WO8301924 A1 * | 6/1983 | ............ B29D 3/02 |
| WO | 9822990 A1 | | 5/1998 |
| WO | 2009085116 A1 | | 7/2009 |
| WO | 2013142178 A1 | | 9/2013 |
| WO | 2017155917 A1 | | 9/2017 |

\* cited by examiner

MODULE WITH REDUCED DETERIORATION OF BINDING MEMBER

CROSS-REFERENCE TO RELATED APPLICATION

This application claims priority to Japanese Patent Application No. 2019-189329 filed on Oct. 16, 2019, incorporated herein by reference in its entirety.

BACKGROUND

1. Technical Field

The disclosure relates to a module having a binding member.

2. Description of Related Art

A technique of binding a battery with use of a binding member is known. The battery expands and contracts as it is charged and discharged. For example, Japanese Unexamined Patent Application Publication No. 2019-106275 (JP 2019-106275 A) discloses a battery module including a laminated body, a pair of end plates, and a binding member. The laminated body is made as a plurality of battery cells is laminated. The end plates are arranged on both end portions of the laminated body in a laminated direction, respectively. The binding member applies a binding load between the end plates. The binding member contains a resin material with an elastic modulus and a strain amount that are within specific ranges, respectively.

Also, a technique of covering an outer periphery of a gas tank with fiber-reinforced plastic is known. For example, Japanese Unexamined Patent Application Publication (Translation of PCT Application) No. 2019-507856 (JP 2019-507856 A) discloses an assembly including a pressure vessel and a component. The pressure vessel contains a fluid and has a dome-shaped end portion with an outer surface. The component is arranged on the dome-shaped end portion. The component is attached to the outer surface by a plurality of filament bands that is wound on the dome-shaped end portion and over at least a part of the component.

SUMMARY

When a battery or a gas tank is bound by a binding member, deterioration of the binding member is likely to occur due to pressure fluctuation generated in the battery or the gas tank. The disclosure has been accomplished in view of this fact, and a main object thereof is to provide a module that restrains deterioration of a binding member caused by pressure fluctuation.

In order to solve above issue, the disclosure provides a module that includes a first member, a pair of second members, and a binding member. The first member is a battery or a gas tank in which pressure fluctuation happens along one axis direction. The second members are arranged on both end portions of the first member in the one axis direction, respectively. The binding member binds the first member and the second members while pressurizing the first member and the second members. The binding member is formed as fiber-reinforced plastic (FRP) containing fiber and resin is revolved. The FRP includes a base fiber layer with a fiber direction along a revolution direction, and a reinforcing fiber layer with a fiber direction different from the fiber direction of the base fiber layer. The reinforcing fiber layer has a non-overlapping portion between both end portions in a revolved state. The non-overlapping portion is positioned in a region facing the first member.

According to the disclosure, since the non-overlapping portion in the reinforcing fiber layer is positioned in the region facing the first member, it is possible to provide the module in which deterioration of the binding member caused by pressure fluctuation is restrained.

In the foregoing disclosure, the fiber direction of the reinforcing fiber layer and the fiber direction of the base fiber layer may be in an orthogonal relation with each other.

In the foregoing disclosure, the module may have a plurality of the non-overlapping portions, and the non-overlapping portions may be positioned in regions facing the first member, respectively.

In the foregoing disclosure, the first member may be the battery.

In the foregoing disclosure, the first member may be the gas tank.

With the module according to the disclosure, an effect is obtained in which deterioration of the binding member caused by pressure fluctuation is restrained.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, a module according to the disclosure is described in detail. In this specification, when a mode where a member is arranged on top of another member is expressed, expressions of "above" and "below" are used.

Unless otherwise specified, these expressions include not only cases where the member is arranged immediately above or immediately below the another member so that these members are in contact with each other, but also cases where the member is arranged above or below the another member through yet another member.

Figure 1:
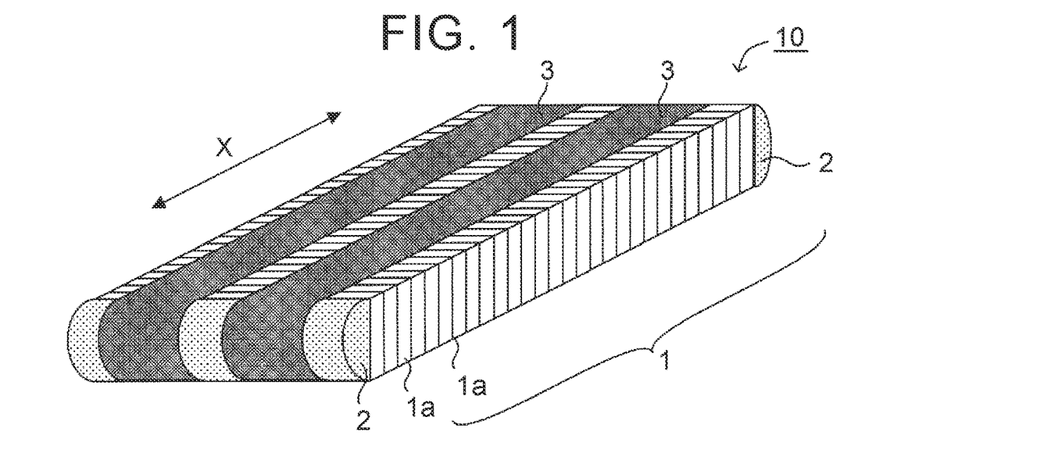
FIG. 1 is a schematic perspective view showing an example of a module according to the disclosure.
Figure 2:
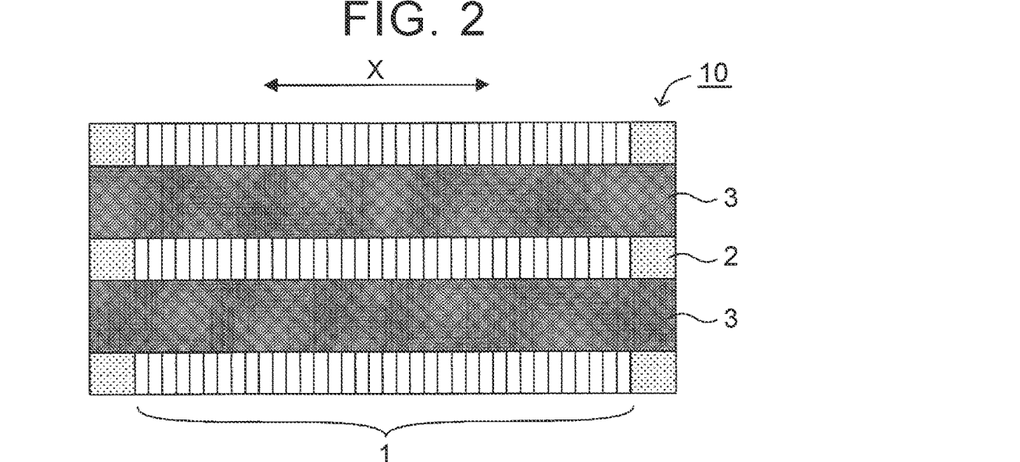
FIG. 2 is a schematic plan view of the module shown in FIG. 1.

FIG. 1 is a schematic perspective view showing an example of the module according to the disclosure. In this module, a first member is a battery. FIG. 2 is a schematic plan view of the module shown in FIG. 1. The module 10 shown in FIG. 1 and FIG. 2 includes the first member 1, a pair of second members (end plates) 2, and a binding member 3. The first member 1 is the battery in which pressure fluctuates along one axis direction X. The second members 2 are arranged on both end portions of the first member 1 in the one axis direction X, respectively. The binding member 3 binds the first member 1 and the second members 2 while pressurizing them.

Figure 3:
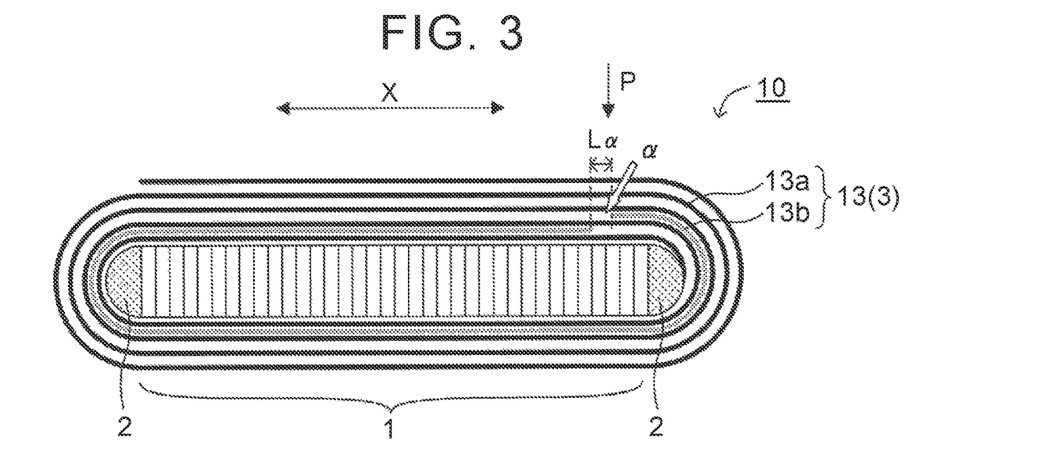
FIG. 3 is a schematic front view of the module shown in FIG. 1.

FIG. 3 is a schematic front view of the module shown in FIG. 1. As shown in FIG. 3, the binding member 3 is formed as fiber-reinforced plastic (FRP) 13 containing fiber and resin is revolved, and the FRP 13 includes a base fiber layer 13a having a fiber direction along the revolution direction, and a reinforcing fiber layer 13b having a fiber direction different from that of the base fiber layer 13a. Further, in a state where the reinforcing fiber layer 13b is revolved, the reinforcing fiber layer 13b has a non-overlapping portion α between both end portions. The non-overlapping portion α is positioned in a region facing the first member 1.

Figure 4:
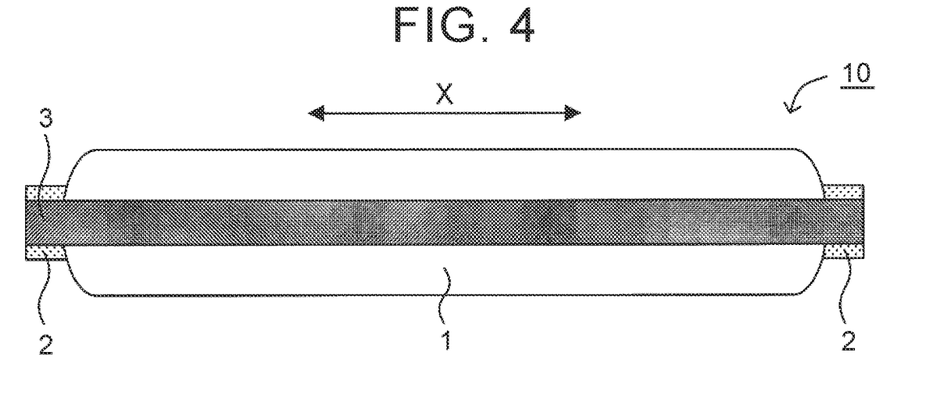
FIG. 4 is a schematic plan view showing an example of the module according to the disclosure.

FIG. 4 is a schematic front view showing an example of the module according to the disclosure. In this module, the first member a gas tank. The module 10 shown in FIG. 4 includes the first member 1, the pair of second members (bases) 2, and the binding member 3. The first member 1 is the gas tank in which pressure fluctuates along one axis direction X. The second members 2 are arranged on both end portions of the first member 1 in the one axis direction X, respectively. The binding member 3 binds the first member 1 and the second members 2 while pressurizing them. The binding member 3 shown in FIG. 4 has a specific configuration similar to FIG. 2 described above, and the non-overlapping portion is positioned in a region facing the first member.

According to the disclosure, because the non-overlapping portion of the reinforcing fiber layer is positioned in the region facing the first member, it is possible to provide the module in which deterioration of the binding member due to pressure fluctuation is restrained. As described above, when the battery or the gas tank is bound by the binding member, deterioration of the binding member is likely to happen due to pressure fluctuation that occurs in the battery or the gas tank. For example, when the battery expands due to charging, compression stress is generated between the end plates arranged on both end portions of the battery, respectively, and the binding member facing the end plates. On the contrary, when the battery contracts due to discharging, the compression stress is alleviated. Therefore, as the battery is charged and discharged repeatedly, generation and alleviation of the compression stress are also repeated, thus causing deterioration of the binding member due to fatigue.

Figure 5:
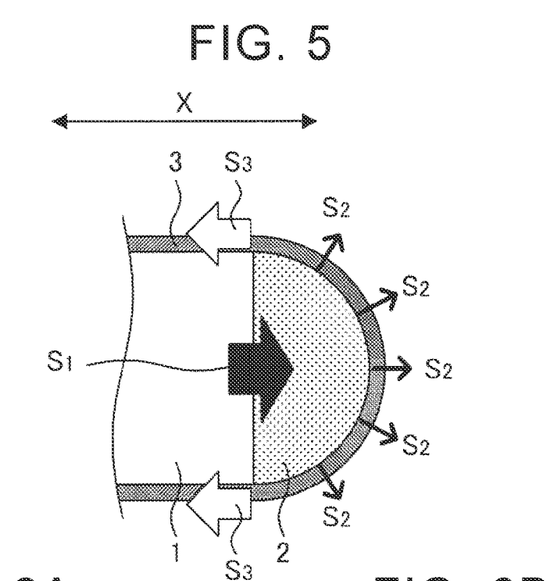
FIG. 5 is a view describing an issue to be solved by the disclosure.

The generation of compression stress is described in detail. As shown in FIG. 5, when pressure fluctuation along the one axis direction happens in the first member 1, then stress $S_1$ is transmitted from the first member 1 to the second member 2, and stress $S_2$ is transmitted from the second member 2 to the binding member 3. At this time, stress $S_3$ is generated in the binding member 3 as reaction force against the stress $S_1$. Although the stress $S_3$ corresponds to tensile stress of the binding member 3, since the base fiber layer included in the binding member 3 has the fiber direction along the revolution direction, the base fiber layer shows high durability against the stress $S_3$. On the other hand, because the stress $S_2$ is generated in the thickness direction of the binding member 3, the base fiber layer included in the binding member 3 has low durability against the stress $S_2$. Therefore, in the disclosure, the reinforcing fiber layer having the fiber direction different from that of the base fiber layer is used. Since the fiber direction of the base fiber layer is different from the fiber direction of the reinforcing fiber layer, the fiber in the base fiber layer and the fiber in the reinforcing fiber layer are arranged so as to intersect each other in an interface between these layers. As the intersection part receives the stress $S_2$ generated in the thickness direction, high durability against the stress $S_2$ is obtained.

Meanwhile, as shown in FIG. 3, the reinforcing fiber layer 13b has the non-overlapping portion a between the both end portions in the revolved state. In other words, the reinforcing fiber layer 13b is revolved so as not to overlap each other. If the reinforcing fiber layer 13b was revolved so as to overlap each other, the thickness of the reinforcing fiber layer would be doubled in its overlapping portion and stress concentration is more likely to happen. Therefore, it is desired that the fiber-reinforced plastic (FRP) is revolved so that no overlapping portion is formed. However, in consideration of manufacturing accuracy (for example, accuracy attributed to contraction when the resin cures), the non-overlapping portion is inevitable.

No examination has been conducted on where such a non-overlapping portion should be located. However, after earnest researches by the inventors, it was found that, when the position of the non-overlapping portion α is set in a region affected by the stress $S_2$ generated in the thickness direction (a region facing the second member), durability against the stress $S_2$ is lowered. Then, it was found that, as the non-overlapping portion a is positioned in a region that is not affected by the stress $S_2$ generated in the thickness direction (a region facing the first member), durability against the stress $S_2$ increases, and deterioration of the binding member caused by pressure fluctuation is thus restrained.

The non-overlapping portion is positioned in the region facing the first member. The "region facing the first member" is a region where the first member 1 is present in a plan view of the module 10 as shown in FIG. 3 (when the module 10 is observed in a direction P). The direction P is normally a direction orthogonal to the one axis direction X, and is a direction parallel to a normal line on a main surface of the binding member 3.

1. First Member

The first member according to the disclosure is the battery or the gas tank in which pressure fluctuation happens along the one axis direction. In the case of the battery, because the battery expands and contracts along with charging and discharging, pressure fluctuation happens along a thickness direction of the battery. The one axis direction of the battery normally corresponds to the thickness direction of the battery. Meanwhile, in the case of the gas tank in which bases are arranged on both end portions of the gas tank, respectively, pressure fluctuation happens in a direction connecting the both end portions as gas is filled in and released from the gas tank. The one axis direction in the gas tank normally corresponds to a direction connecting the bases on both end portions with each other.

Normally, the battery according to the disclosure is a secondary battery that can be charged and discharged repeatedly. Also, the battery according to the disclosure has at least one battery cell, and it is preferred that the battery has a plurality of the battery cells. It is preferred that the battery cells 1a are laminated in the thickness direction (the one axis direction X) as shown in FIG. 1. The battery cells may be connected with each other in series or in parallel.

It is also preferred that the battery according to the disclosure includes at least a positive electrode, an electrolyte layer, and a negative electrode. The electrolyte layer may be a layer containing an electrolytic solution, a layer containing polymer electrolyte, or a layer containing inorganic solid electrolyte. It is particularly preferred that the battery according to the disclosure is a solid-state battery in which the electrolyte layer contains the inorganic solid electrolyte. Although high binding pressure is often required in order for the solid-state battery to exert sufficient performance, when the high binding pressure is applied, deterioration of the binding member due to pressure fluctuation is likely to happen. In order to address this, according to the disclosure, the non-overlapping portion is arranged at a specific position so that deterioration of the binding member caused by pressure fluctuation is effectively restrained. Although the binding pressure applied to the solid-state battery is not particularly limited, the binding pressure may be, for example, 1.0 MPa or higher, or 2.0 MPa or higher. Meanwhile, the binding pressure applied to the solid-state battery is, for example, 50 MPa or lower. Also, the battery according to the disclosure may be a fuel cell.

The gas tank according to the disclosure has a liner that has a space inside for sealing gas. A material for the liner includes, for example, resin such as nylon-based resin (polyamide-based resin), and polyethylene-based resin. It is preferred that the gas tank further has a reinforcing layer that covers an outer peripheral surface of the liner. It is preferred that the reinforcing layer is a layer having fiber-reinforced plastic (FRP) that contains fiber and resin. The fiber may be, for example, carbon fiber, glass fiber, and aramid fiber. The resin may be, for example, thermosetting resin such as epoxy resin, polyester resin, and polyamide resin. A method for forming the reinforcing layer may be, for example, a method in which the fiber impregnated with the resin is wound around a surface of the liner by a filament winding method, and then the rein is cured.

Further, it is preferred that the gas tank is a high-pressure gas tank. In the case of the high-pressure gas tank, the pressure fluctuation tends to be large, and deterioration of the binding member caused by the pressure fluctuation is likely to happen. Meanwhile, according to the disclosure, because the non-overlapping portion is arranged at a specific position, it is possible to effectively restrain deterioration of the binding member caused by the pressure fluctuation. The high-pressure gas means gas that meets the definition by Globally Harmonized System of Classification and Labelling of Chemicals (GHS). Also, according to the disclosure, it is preferred that the gas tank is a hydrogen gas tank.

2. Second Member

The second members according to the disclosure are members arranged on the both end portions of the first member in the one axis direction, respectively. When the first member is the battery, the second members correspond to the end plates. Meanwhile, when the first member is the gas tank, the second members correspond to the bases. It is preferred that the second members have high rigidity. A material for the second members may be, for example, metal such as carbon steel and aluminum, and resin. Since the base connects an inside and an outside of the gas tank, the base is a member that is most susceptible to a pressure load of the gas.

Figure 6A:
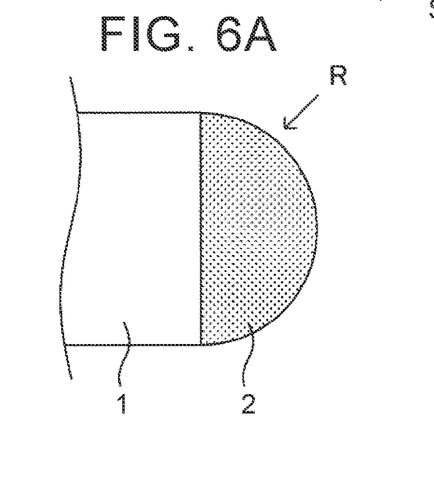
FIG. 6A is a schematic sectional view showing an example of a second member according to the disclosure.
Figure 6B:
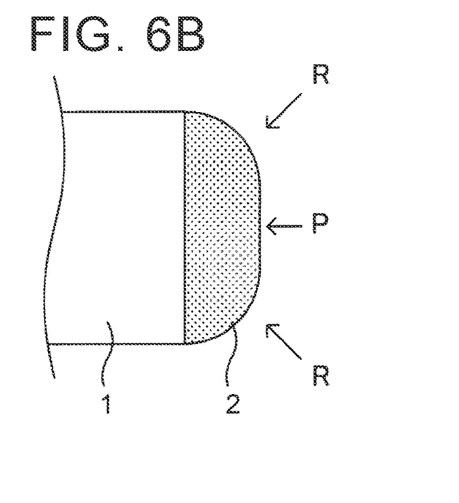
FIG. 6B is a schematic sectional view showing the example of the second member according to the disclosure.

It is preferred that a region of the second member facing the binding member has a curved surface shape. As the region has the curved surface shape, it is possible to restrain stress concentration caused by pressure fluctuation. In terms of restraint of stress concentration, the region of the second member facing the binding member may or may not have a flat surface shape. For example, in the second member 2 shown in FIG. 6A, the region facing the binding member does not have the flat surface shape, and has the curved surface shape R only. Meanwhile, in the second member 2 shown in FIG. 6B, the region facing the binding member has the curved surface shape R and the flat surface shape P. As shown in FIG. 6B, it is preferred that the curved surface shapes R are formed in both ends of the flat surface shape P, respectively. Meanwhile, it is preferred that the second member and the first member are in surface contact with each other. Because of the surface contact, stress concentration caused by the binding pressure is restrained. The shape of the second member is, for example, a shape obtained as a circular column or an elliptical column is cut along a plane parallel to a height direction. For example, the second member 2 in FIG. 1 has a shape obtained as a center of a circle of a circular column is cut along a plane parallel to a height direction.

3. Binding Member

The binding member according to the disclosure is a member that binds the first member and the second members while pressurizing them. Normally, the binding member is a hoop-shaped member that covers outer peripheral surfaces of the first member and the second members. The binding member is formed as the fiber-reinforced plastic (FRP) containing the fiber and the resin is revolved (wound). Specifically, as shown in FIG. 3, the binding member 3 is formed as the FRP 13 is revolved around the outer peripheral surfaces of the first member 1 and the second members 2.

The fiber-reinforced plastic (FRP) contains the fiber and the resin. The fiber includes carbon fiber, glass fiber, and aramid fiber, and the carbon fiber is particularly preferred. The carbon fiber includes, for example, polyacrylonitrile (PAN)-based carbon fiber, rayon-based carbon fiber, and pitch-based carbon fiber. Meanwhile, the resin may be thermosetting resin such as epoxy resin, polyester resin, and polyamide resin.

The method for forming the FRP is not particularly limited, but may be, for example, a vacuum bag method, an autoclave method, a sheet winding method, a hand layup method, and a filament winding method.

Figure 7A:
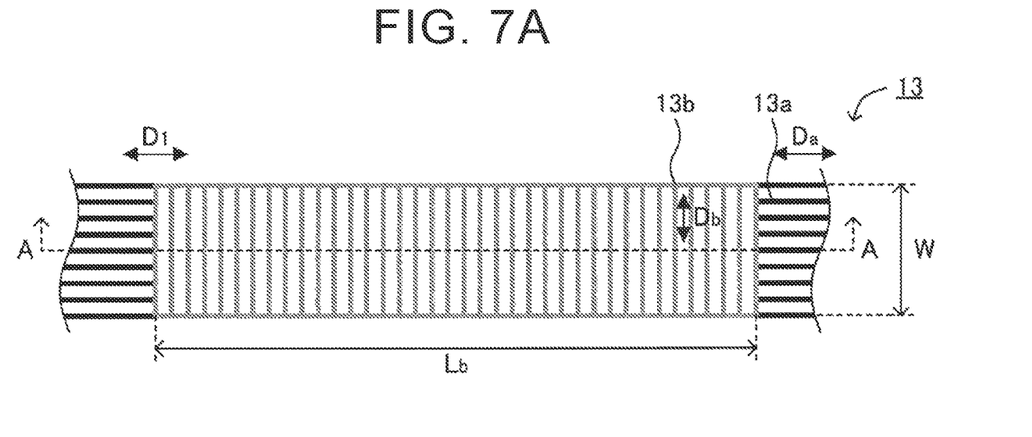
FIG. 7A is a view describing FRP according to the disclosure.
Figure 7B:
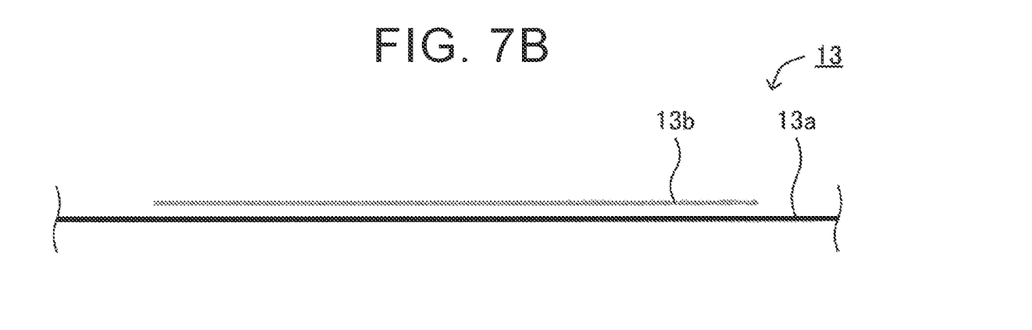
FIG. 7B is a view describing the FRP according to the disclosure.

The FRP includes the base layer with the fiber direction along the revolution direction, and the reinforcing fiber layer with the fiber direction different from that of the base fiber layer. FIG. 7A is a schematic plan view showing an example of the FRP according to the disclosure. FIG. 7B is a sectional view taken along the line A-A in FIG. 7A. As shown in FIGS. 7A and 7B, the FRP 13 has the base fiber layer 13a having the fiber direction Da along the revolution direction Di, and the reinforcing fiber layer 13b having the fiber direction Db different from that of the base fiber layer 13a.

The base fiber layer is normally a long sheet and has the fiber direction along the revolution direction. The "fiber direction along the revolution direction" means that the fiber direction in the base fiber layer is in a parallel relation with the revolution direction. The "parallel relation" includes not only a case where the fiber direction is strictly parallel to the revolution direction, but also a case where an angle (on an acute angle side) made by the both directions is 10° or smaller. The revolution direction Di normally coincides with a longitudinal direction of the base fiber layer.

A length of the base fiber layer changes depending on the number of revolutions around the outer peripheral surfaces of the first member and the second members, but may be at least 10 times longer, or at least 20 times longer than the length of the outer peripheral surfaces. Meanwhile, the length of the base fiber layer is, for example, maximum 100 times longer than the length of the outer peripheral surfaces. Further, the thickness of the base fiber layer may be, for example, 0.05 mm or larger, or 0.08 mm or larger. Meanwhile, the thickness of the base fiber layer is, for example, 0.5 mm or smaller. A width of the base fiber layer (a width W in FIG. 7A) is set as appropriate in accordance with the use.

The reinforcing fiber layer has the fiber direction different from that of the base fiber layer. The "different fiber direction" means that an angle (an acute angle side) made by the fiber direction of the reinforcing fiber layer and the fiber direction of the base fiber layer is 1° or larger. The angle described above may be 30° or larger, 45° or larger, and 60° or larger.

In particular, according to the disclosure, it is preferred that the fiber direction Db of the reinforcing fiber layer 13b and the fiber direction Da of the base fiber layer 13a are in an orthogonal relation. The "orthogonal relation" includes not only a case where those fiber directions are strictly orthogonal to each other, but also a case where an angle (an acute angle side) made by the both directions is 80° or larger but not exceeding 90°.

The length of the reinforcing fiber layer is a length with which the non-overlapping portion to be described below is made. As shown in FIG. 7A, when the length of the reinforcing fiber layer 13b is denoted by $L_b$, $L_b$ is almost the same as the length of the outer peripheral surfaces of the first member and the second members. Also, it is preferred that the reinforcing fiber layer 13b is formed on one of surfaces of the base fiber layer 13a as shown in FIG. 7B. The thickness of the reinforcing fiber layer may be, for example, 0.05 mm or larger, or 0.08 mm or larger. Meanwhile, the thickness of the reinforcing fiber layer is, for example, 0.5 mm or smaller.

A ratio of the thickness of the reinforcing fiber layer to the total thickness of the base fiber layer and the reinforcing fiber layer may be, for example, 10% or higher, or 30% or higher. When the ratio of the thickness of the reinforcing fiber layer is too low, durability against compression stress generated in the thickness direction can be lowered. On the other hand, the ratio of the thickness of the reinforcing fiber layer to the total thickness of the base fiber layer and the reinforcing fiber layer may be, for example, 90% or lower, or 70% or lower. When the ratio of the thickness the reinforcing fiber layer is too high, durability against tensile stress in the revolution direction can be lowered.

As shown in FIG. 3, the reinforcing fiber layer 13b has the non-overlapping portion α between the both end portions in the revolved state. When the length of the non-overlapping portion α is $L_α$, the value of $L_α$ may be, for example, 50 mm or smaller, or 10 mm or smaller. Meanwhile, the value of $L_α$ may be, for example, 1 mm or larger, or 5 mm or larger. Also, when the length of the outer peripheral surfaces of the first member and the second members is $L_β$, it is preferred that a ratio of $L_α$ to $L_β$ ($L_α/L_β$) is, for example, 3.0% or smaller, or 2.3% or smaller. Meanwhile, the ratio of $L_α$ to $L_β$ ($L_α/L_β$) may be, for example, 0.1% or higher, or 0.2% or higher.

Figure 8:
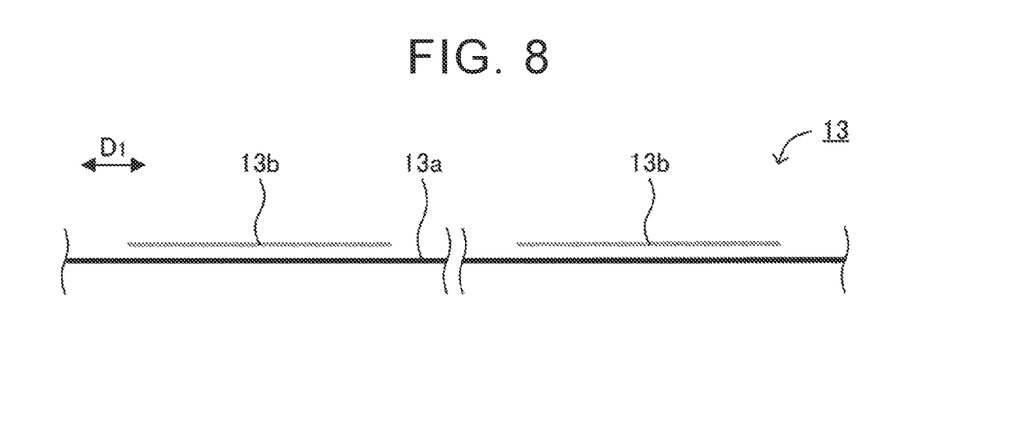
FIG. 8 is a view describing the FRP according to the disclosure.

According to the disclosure, it is preferred that the FRP includes a plurality of the reinforcing fiber layers. It is preferred that the reinforcing fiber layers 13b are formed along the revolution direction Di as shown in FIG. 8. The number of the reinforcing fiber layers in the FRP may be one, two or more, four or more, or eight or more. Meanwhile, the number of the reinforcing fiber layers in the FRP is, for example, 30 or smaller.

4. Module

The module according to the disclosure has the first member, the second members, and the binding member described above. Also, it is preferred that the module according to the disclosure has a plurality of the non-overlapping portions because it is possible to further restrain deterioration of the binding member due to pressure fluctuation. Also, it is preferred that the non-overlapping portions are positioned in regions facing the first member, respectively. The number of the non-overlapping portions positioned in the regions facing the first member may be one, two or more, four or more, or eight or more. The number of the non-overlapping portions positioned in the regions facing the first member is, for example, 30 or smaller.

Although application of the module according to the disclosure is not particularly limited, the module may be, for example, mounted on a vehicle. Also, the disclosure is able to provide a vehicle having the module described above.

The disclosure is not limited to the foregoing embodiment. The embodiment is an example only, and anything having a configuration substantially the same as or effects similar to those of the technical idea described in the scope of claims of this disclosure is included in the technical scope of the disclosure.

Comparative Example 1

Figure 9A:
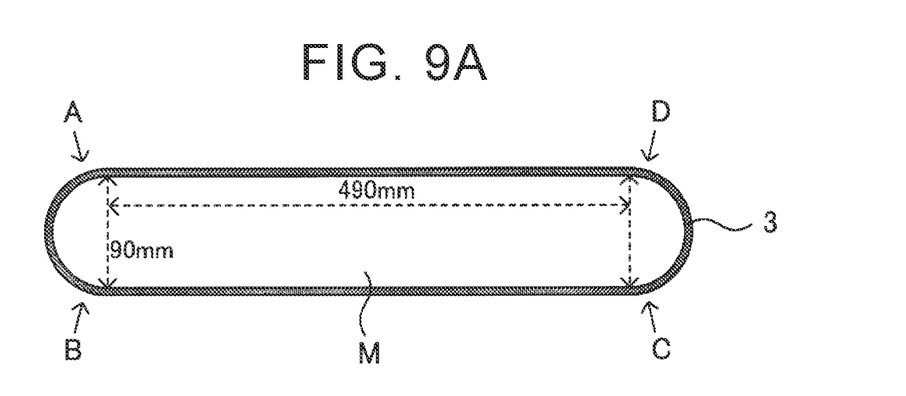
FIG. 9A is a view describing a binding member according to comparative example 1.

As shown in FIG. 9A, a prepreg of carbon fiber reinforced resin (CFRP) having a base fiber layer and a reinforcing fiber layer was revolved around an outer peripheral surface of a mold M corresponding to a shape of the first member and the second members, put into an autoclave together with the mold M, and formed. Thereafter, the mold M was removed, and the binding member 3 was obtained. The base fiber layer was a 0° fiber layer in which the fiber is parallel to the revolution direction. Meanwhile, the reinforcing fiber layer was a 90° fiber layer in which the fiber was orthogonal to the revolution direction, and the layer was formed on one of surfaces of the base fiber layer. Also, the number of revolutions of the base fiber layer was 34, and four of the reinforcing fiber layers were provided in the base fiber layer in each of four revolutions. The thickness of the binding member was 3.06 mm, and a width was 15 mm. Also, the positions of the reinforcing fiber layers with respect to the base fiber layer were adjusted so that non-overlapping portions A to D in the four reinforcing fiber layers were positioned in radii of the second members 2, respectively, as shown in FIG. 9A.

Example 1

Figure 9B:
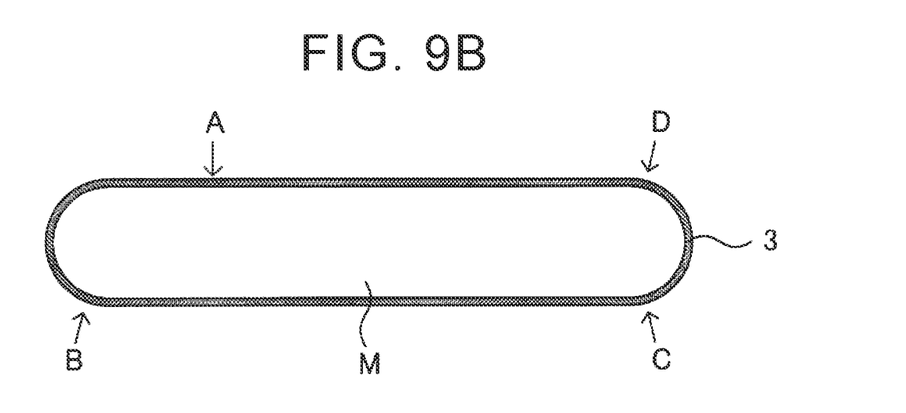
FIG. 9B is a view describing a binding member according to example 1.

The binding member was obtained similarly to the comparative example 1 except that the position of the non-overlapping portion A located in the innermost position among the non-overlapping portions A to D was changed to a position within a region facing the first member as shown in FIG. 9B.

Example 2

Figure 9C:
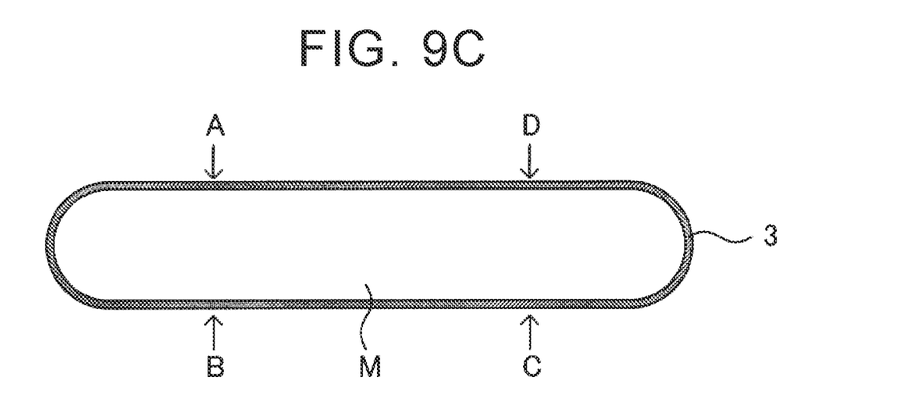
FIG. 9C is a view describing a binding member according to example 2.

The binding member was obtained similarly to the comparative example 1 except that the positions of all of the non-overlapping portions A to D were changed to positions within regions facing the first member, respectively, as shown in FIG. 9C.

Evaluation

Figure 10A:
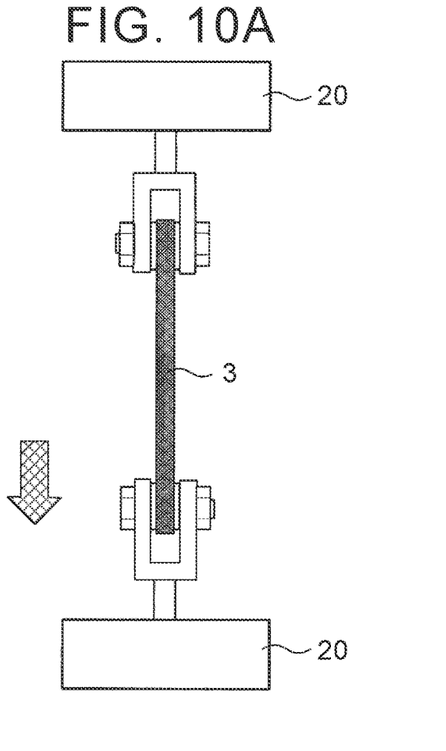
FIG. 10A is a view describing fatigue testing.
Figure 10B:
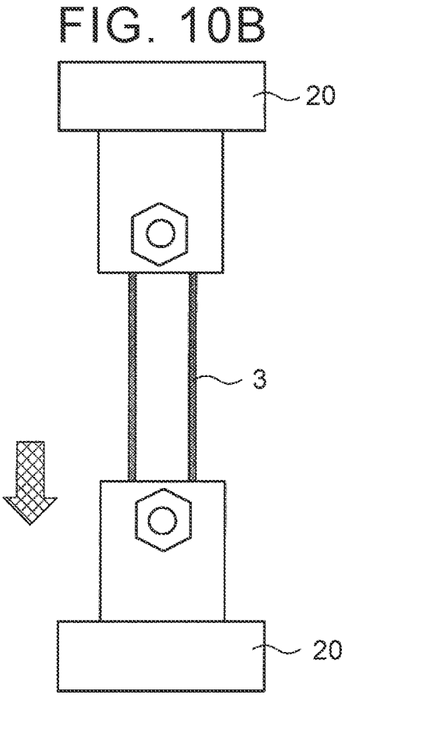
FIG. 10B is a view describing the fatigue testing.

Fatigue testing was conducted on the binding members obtained in the examples 1, 2 and the comparative example 1. Specifically, as shown in FIG. 10A and FIG. 10B, the binding member 3 was attached to a pair of jigs 20, and pulsating (stress ratio of 0.1) in which only one of the jigs 20 is vibrated was conducted. Then, the number of cycles was measured until the binding member 3 fractured. As loading conditions, a condition I (100.4 kN) and a condition II (122.4 kN) were used. The results are shown in Table 1, Table 2, and FIG. 11.

TABLE 1

| Condition I | Comparative Example 1 | Example 1 | Example 2 |
|---|---|---|---|
| Load [kN] | 100.4 | 100.4 | 100.4 |
| Stress [MPa] | 1094 | 1094 | 1094 |
| Cycles [Counts] | 19300 | 30215 | 38830 |

TABLE 2

| Condition II | Comparative Example 1 | Example 1 | Example 2 |
|---|---|---|---|
| Load [kN] | 122.4 | 122.4 | 122.4 |
| Stress [MPa] | 1333 | 1333 | 1333 |
| Cycles [Counts] | 5972 | 6756 | 16782 |

Figure 11:
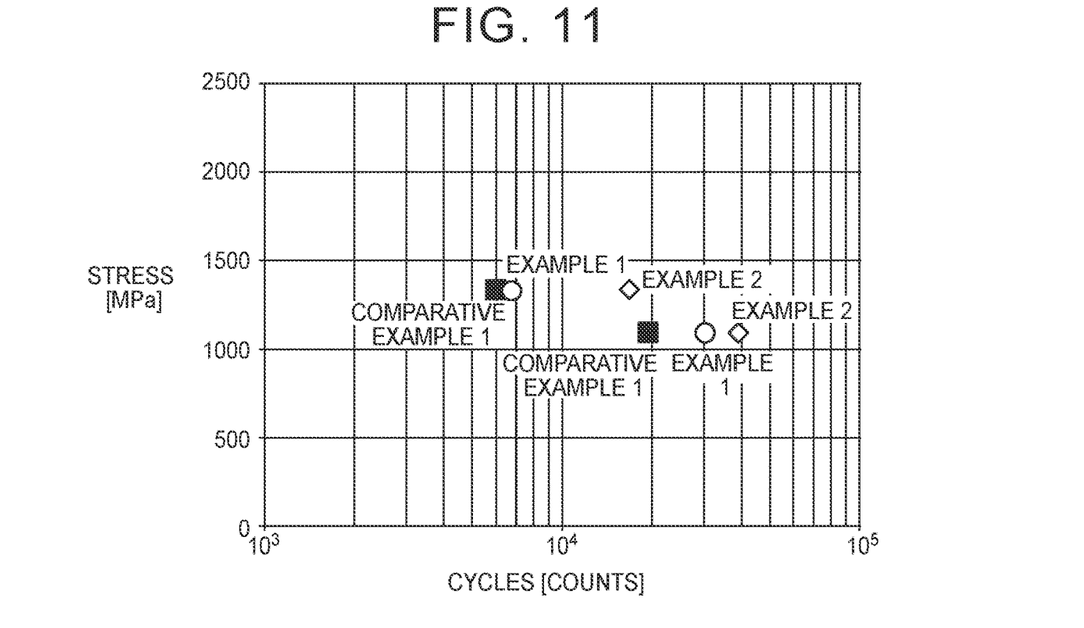
FIG. 11 shows results of the fatigue testing for the binding members obtained in the comparative example 1 and the examples 1, 2, respectively.

As shown in Table 1, Table 2, and FIG. 11, it was confirmed that the binding members 3 of the examples 1, 2 were less likely to fracture compared to that of the comparative example 1 and had better durability. Thus, it was confirmed that the position of the non-overlapping portion in the reinforcing fiber layer greatly affects durability. In particular, in the example 2, remarkably excellent effects were obtained. Specifically, under the condition I, the number of cycles of the example 2 until fracture was even 2.0 times that of the comparative example 1. Further, under the condition II, the number of cycles of the example 2 until fracture was even 2.8 times that of the comparative example 1.

What is claimed is:

1. A module comprising:
   a first member that is a battery or a gas tank in which pressure fluctuation happens along one axis direction;
   a pair of second members, the second members being arranged on both end portions of the first member in the one axis direction, respectively; and
   a binding member that binds the first member and the second members while pressurizing the first member and the second members, wherein:
   the binding member is formed as fiber-reinforced plastic (FRP) containing fiber and resin is revolved;
   the FRP includes a base fiber layer with a fiber direction along a revolution direction, and a reinforcing fiber layer with a fiber direction different from the fiber direction of the base fiber layer;
   the reinforcing fiber layer has a non-overlapping portion between both end portions in a revolved state; and
   the non-overlapping portion is positioned in a region facing the first member;
   wherein a length of the non-overlapping portion along a circumferential direction is between 0.1% and 3.0% of a circumferential length of the outer peripheral surfaces of the first and second members.

2. The module according to claim 1, wherein the fiber direction of the reinforcing fiber layer and the fiber direction of the base fiber layer are in an orthogonal relation with each other.

3. The module according to claim 1, wherein:
   the module has a plurality of the non-overlapping portions; and
   the non-overlapping portions are positioned in regions facing the first member, respectively.

4. A module comprising:
   a first member that is a battery or a gas tank in which pressure fluctuation happens along one axis direction;
   a pair of second members, the second members being arranged on both end portions of the first member in the one axis direction, respectively; and
   a binding member that binds the first member and the second members while pressurizing the first member and the second members, wherein:
   the binding member is formed as fiber-reinforced plastic (FRP) containing fiber and resin is revolved;
   the FRP includes a base fiber layer with a fiber direction along a revolution direction, and a reinforcing fiber layer with a fiber direction different from the fiber direction of the base fiber layer;
   the reinforcing fiber layer has a non-overlapping portion between both end portions in a revolved state; and
   the non-overlapping portion is positioned in a region facing the first member;
   wherein the first member is the battery; and
   wherein a length of the non-overlapping portion along a circumferential direction is between 0.1% and 3.0% of a circumferential length of the outer peripheral surfaces of the first and second members.

5. A module comprising:
   a first member that is a battery or a gas tank in which pressure fluctuation happens along one axis direction;
   a pair of second members, the second members being arranged on both end portions of the first member in the one axis direction, respectively; and
   a binding member that binds the first member and the second members while pressurizing the first member and the second members, wherein:
   the binding member is formed as fiber-reinforced plastic (FRP) containing fiber and resin is revolved;
   the FRP includes a base fiber layer with a fiber direction along a revolution direction, and a reinforcing fiber layer with a fiber direction different from the fiber direction of the base fiber layer;
   the reinforcing fiber layer has a non-overlapping portion between both end portions in a revolved state; and
   the non-overlapping portion is positioned in a region facing the first member;
   wherein the first member is the gas tank; and
   wherein a length of the non-overlapping portion along a circumferential direction is between 0.1% and 3.0% of a circumferential length of the outer peripheral surfaces of the first and second members.

* * * * *